(12) United States Patent
Km et al.

(10) Patent No.: US 9,389,632 B2
(45) Date of Patent: Jul. 12, 2016

(54) ENERGY EFFICIENT SOLAR POWERED HIGH VOLTAGE DIRECT CURRENT BASED DATA CENTER

(71) Applicant: International Business Machines Corporation, Armonk, NY (US)

(72) Inventors: Shankar Km, Bangalore (IN); William P. Kostenko, Poughkeepsie, NY (US); Anand D. Meshram, Bangalore (IN); Kota V R M Murali, Bangalore (IN); Roger R. Schmidt, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 525 days.

(21) Appl. No.: 13/790,552

(22) Filed: Mar. 8, 2013

(65) Prior Publication Data

US 2014/0117965 A1 May 1, 2014

Related U.S. Application Data

(63) Continuation of application No. 13/661,367, filed on Oct. 26, 2012.

(51) Int. Cl.
*G05F 3/08* (2006.01)
*H02J 1/10* (2006.01)
*H02J 3/38* (2006.01)

(52) U.S. Cl.
CPC ... *G05F 3/08* (2013.01); *H02J 1/10* (2013.01); *H02J 3/385* (2013.01); *Y02E 10/58* (2013.01); *Y10T 307/50* (2015.04); *Y10T 307/658* (2015.04); *Y10T 307/685* (2015.04)

(58) Field of Classification Search
CPC .................................... H02J 1/10; H02J 3/38
See application file for complete search history.

(56) References Cited

U.S. PATENT DOCUMENTS

| | | | |
|---|---|---|---|
| 7,560,831 B2 | 7/2009 | Whitted et al. | |
| 7,629,708 B1 * | 12/2009 | Meyers | H02J 7/35 307/66 |
| 7,961,463 B2 | 6/2011 | Belady et al. | |
| 8,010,815 B2 | 8/2011 | Hamilton, II et al. | |
| 8,716,891 B2 * | 5/2014 | Choi | 307/71 |
| 2007/0205669 A1 | 9/2007 | May | |
| 2008/0030078 A1 | 2/2008 | Whitted et al. | |
| 2011/0148213 A1 | 6/2011 | Baldwin et al. | |
| 2012/0043923 A1 | 2/2012 | Ikriannikov et al. | |
| 2012/0069512 A1 | 3/2012 | Chang | |
| 2013/0069438 A1 * | 3/2013 | Liu | H02J 3/385 307/82 |
| 2014/0001864 A1 * | 1/2014 | Nirantare et al. | 307/71 |

OTHER PUBLICATIONS

Internet Article, "Green Data Center uses Direct Current to Save Energy," retrieved from http://earthandindustry.com/2012/06/green-data-center-uses-direct-current-to-save-energy/; Jun. 1, 2012; pp. 1-2.

* cited by examiner

*Primary Examiner* — Rexford Barnie
*Assistant Examiner* — Terrence Willoughby
(74) *Attorney, Agent, or Firm* — Cantor Colburn LLP; Margaret McNamara

(57) ABSTRACT

A system and method for providing power is disclosed. A variable direct current (DC) power source provides a variable DC voltage. A configurator dynamically converts the variable DC voltage to a selected DC voltage to provide the power. A set of switches combines the solar voltage with a substantially constant DC voltage. A control unit controls the set of switches and the configurator to provide the combined voltages at a selected voltage level.

8 Claims, 18 Drawing Sheets

ENERGY EFFICIENT SOLAR POWERED HIGH VOLTAGE DIRECT CURRENT BASED DATA CENTER

CROSS REFERENCE TO RELATED APPLICATIONS

This application is a Continuation of U.S. Non-Provisional application Ser. No. 13/661,367, entitled "ENERGY EFFICIENT SOLAR POWERED HIGH VOLTAGE DIRECT CURRENT BASED DATA CENTER," filed on Oct. 26, 2012, which is incorporated herein by reference in its entirety.

BACKGROUND

The present disclosure relates to power systems and, in particular, to a solar energy power system for providing DC power to an electrical load.

One of the biggest costs in operating a data computing centers is power cost. Power is needed to operate servers and storage systems. Since these servers and storage systems heat up, more power is then needed in order to provide air conditioning and other cooling systems. Solar power has been proposed as an alternative or supplemental power source for data computing centers. However, current methods of supplying solar power use an inefficient method of converting direct current (DC) voltage from solar panels to an alternating current (AC) voltage that is then supplied to a power grid coupled to the data computing center.

SUMMARY

According to one embodiment, a system for providing power includes: a variable direct current (DC) power source that provides a variable DC voltage; and a configurator configured to dynamically convert the variable DC voltage to a selected DC voltage to provide the power.

According to another embodiment, a method of powering an electronic device includes: receiving a variable DC voltage from a variable DC power source; dynamically converting the variable DC voltage to a selected DC voltage; and providing the selected DC voltage to the electronic device.

According to another embodiment, a system for supplying solar energy to a location includes: a configurator configured to convert variable direct current (DC) voltage from one or more solar panels to selected solar voltage; a source of substantially constant DC voltage; and a set of switches configured to combine the solar voltage and the substantially constant DC voltage; and a control unit configured to control the set of switches and the configurator to provide the combined voltages at a selected voltage level.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
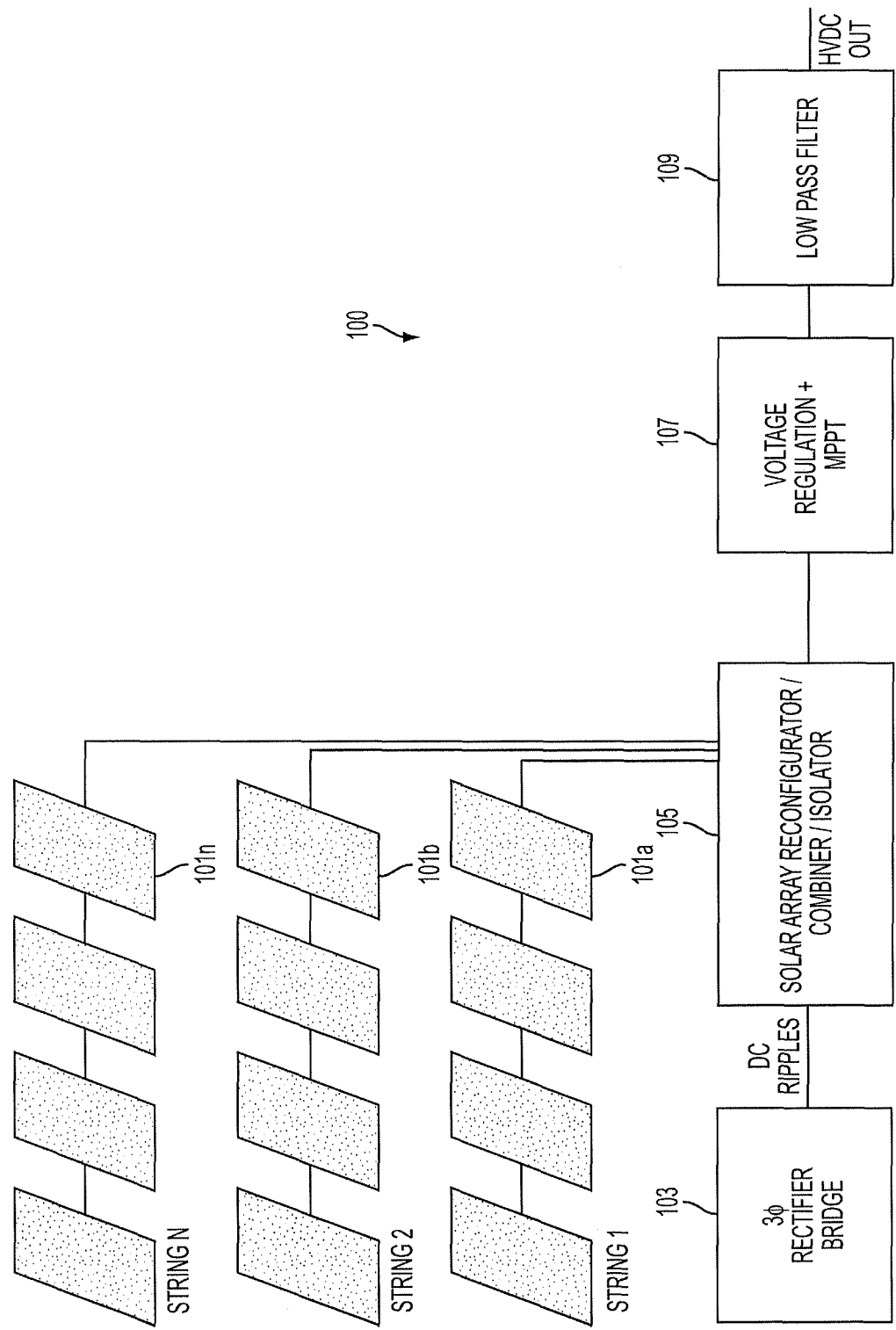
FIG. 1 shows a diagram of an exemplary power system of the present disclosure.

FIG. 1 shows a diagram of an exemplary power system 100 of the present disclosure. The exemplary power system 100 may receive input from a variable voltage source, such as an array of solar panels, as well as from a substantially non-variable voltage source, such as a rectified voltage from a power grid, and may provide a suitable combination of these voltages to an electronic device. In various embodiments, the exemplary power system 100 provides power to a data center, computing center or other type of center that has high voltage direct current (DC) demands. The exemplary power system 100 includes to one or more strings of solar panels, shown as String 1 (101a), String 2 (101b) and String N (101c) for illustrative purposes. An exemplary string of solar panels may include only one solar panel or may include multiple solar panels that are coupled to each other using a serial connection or a parallel connection. The exemplary power system 100 further includes a rectifier 103, such as the exemplary three-phase rectifier 103, which receives input from an alternating current (AC) power source, such as a power grid (not shown), and outputs a rectified DC voltage. A solar array module 105 receives the variable voltage from the one or more strings of solar arrays 101a-101n and the non-variable voltage from the rectifier 103 and outputs a suitable combination of the received voltages. The solar array module includes a configurator (see FIG. 2) that is configured to provide a DC-DC voltage conversion from the variable voltage provided by the string of solar panels to a selected voltage, referred to herein as the solar voltage. In one embodiment, the configurator dynamically places the strings of solar arrays into various combinations of serial and parallel connections, thereby changing a voltage output of the configurator. Operation of the solar array configurator is discussed further with respect to FIGS. 7-12. The solar array module also includes a series of switches that may be configured to connect or disconnect the configurator and the rectifier 103 in various combinations, as discussed below with respect to FIGS. 2 and 3. The switches either isolate the solar panels, isolates the rectifier or combines them in various operational modes, as discussed below with respect to FIGS. 4-6.

The exemplary power system further includes a regulator module 107. The regulator module 107 may include a voltage regulator suitable for regulating the rectified voltage signal using at least one of a buck converter for decreasing a voltage output or a boost converter for increasing a voltage output, and a maximum power point tracking (MPPT) device that provides a suitable load to the solar voltage to obtain a selected power, usually a maximal power, from the solar voltage. A low pass filter 109 receives the regulated voltage from the regulator module 107 and is configured to remove residual high-frequency fluctuations in the regulated voltage and to provide an output voltage as high-voltage direct current (HVDC) voltage. The HVDC voltage may be supplied directly to the exemplary data center or to an intervening device such as an internal bus line or a battery, for example.

Figure 2:
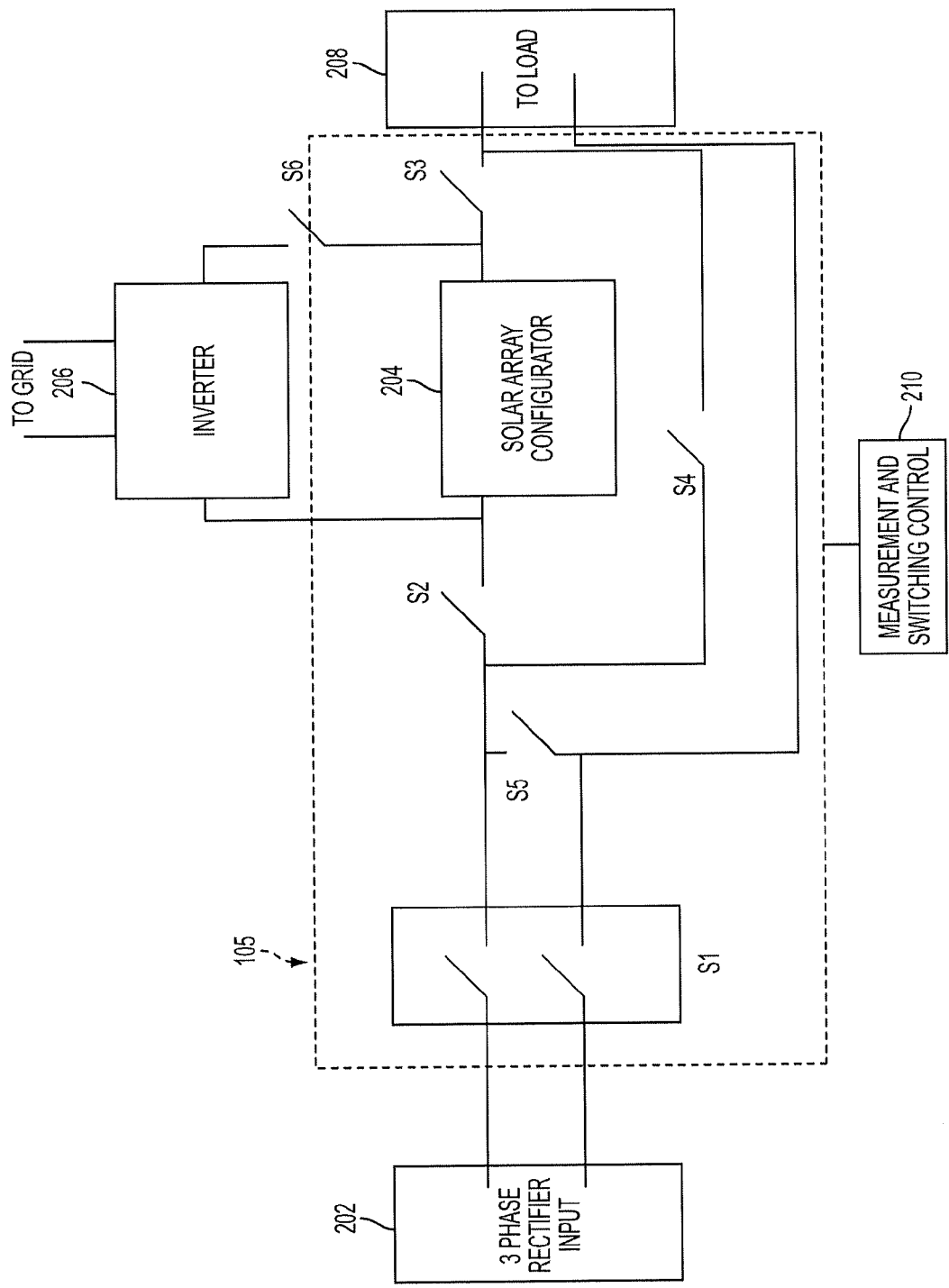
FIG. 2 shows a detailed view of an exemplary solar array module of the present disclosure.

FIG. 2 shows a detailed view of an exemplary solar array module 105 of the present disclosure. The exemplary solar array module 105 includes one or more switches S1-S6 for selecting a coupling between a rectifier 202 and a solar array configurator 204. The solar array configurator 204 may be coupled to the exemplary string of solar panels 101a-101n (see FIG. 1). The solar array module 105 outputs a voltage to load 208 according to the selected operational mode of the solar array module 105. In one embodiment, the solar array module 105 may be coupled to an inverter 206 that provides excess generator power within the solar array module 105 to a power grid. In alternative embodiments, the solar array module 105 may be coupled to a local power storage device. Various measurement devices are coupled to the solar module to control an operation of the exemplary power system 100, as discussed with respect to FIG. 3.

Figure 3:
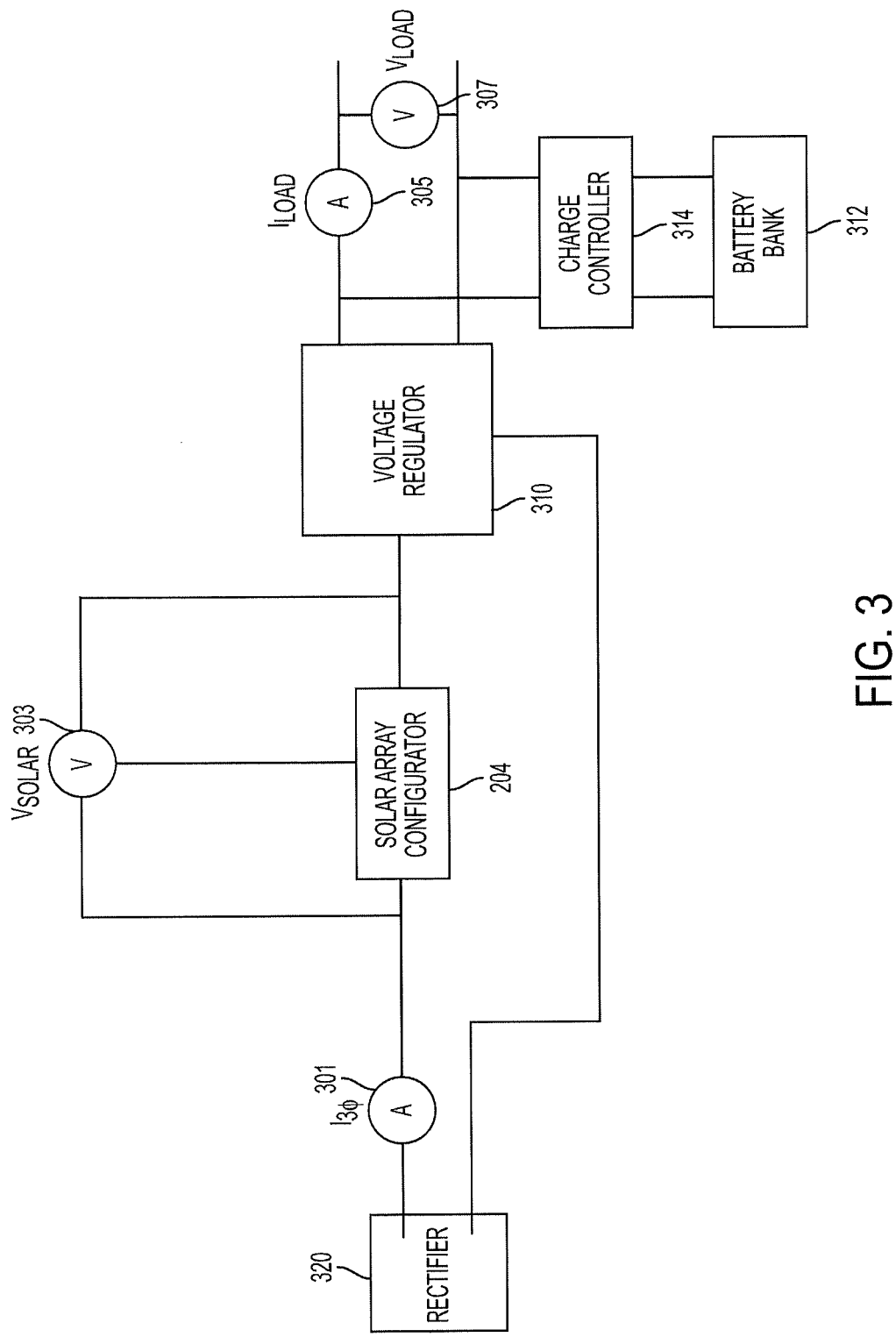
FIG. 3 shows an exemplary placement of measurement devices for monitoring an operation of the exemplary power system of the present disclosure.

FIG. 3 shows an exemplary placement of measurement devices for monitoring an operation of the exemplary power system 100. Ammeter 301 measures a current supplied by the rectifier 320, and voltmeter 303 measures a solar voltage across the solar array configurator 204. Ammeter 305 and voltmeter 307 measure current and voltage, respectively, provided by the voltage regulator 310 to an exemplary load of the circuit, i.e., the exemplary data center. In various embodiments, a battery bank 312 may be coupled to the line voltage of the voltage regulator via a charge controller 314. The battery bank power may be used during switching times between the exemplary operational modes disclosed herein, wherein the batteries provides a constant voltage to the output of the voltage regulator 310 that fills in for an absence of voltage during the flipping of the switches when changing operational modes. Typical switching times are on the order of a few milliseconds.

Figure 4:
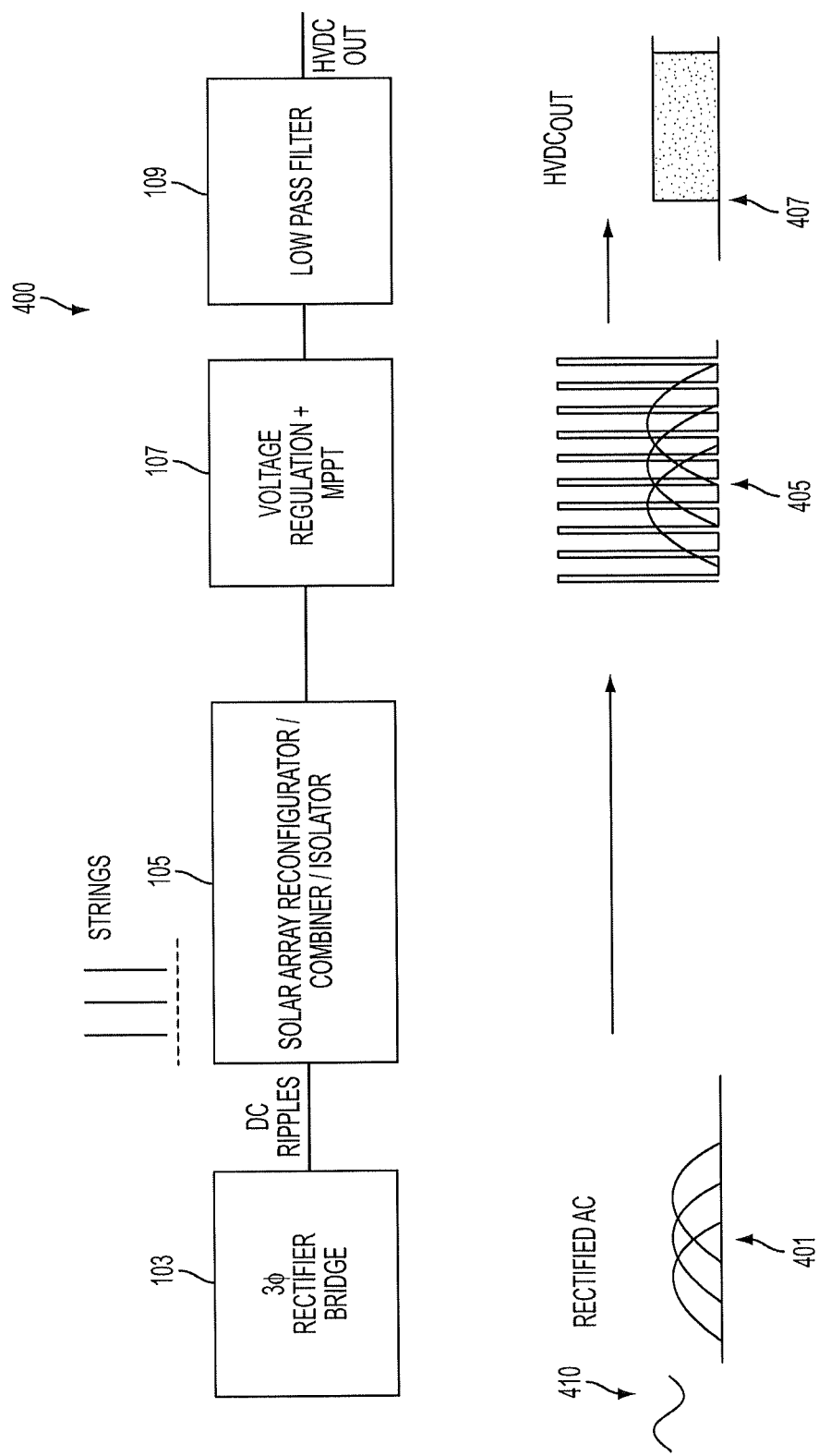
FIG. 4 illustrates an exemplary operational mode of the exemplary power system using only AC-rectified DC voltage.

FIG. 4 illustrates an exemplary operational mode 400 of the exemplary power system 100 using only AC-rectified DC voltage. In various embodiments, the operational mode 400 may be used when a voltage supplied by the string of solar panels is zero or substantially zero ($V_{solar}=0$), such as at night or during extreme cloud cover. The rectifier 103 receives AC voltage 410 and supplies an AC-rectified DC voltage 401 as output. The AC-rectified DC voltage 401 may include various voltage ripples as an artifact of the rectification. The AC-rectified DC voltage 401 is received at the solar array module 105. In the exemplary operation mode 400 of FIG. 4, the switches of the solar array module 105 are configured to isolate the string of solar panels, so that no voltage is received from the solar panels at the solar array module 105. The rectified voltage 301 is therefore passed from the rectifier 103 through the solar array module 105 to the voltage regulator that may regulate the rectified voltage 401 via buck or boost converter. The regulated voltage is then filtered at the filter 109 to provide a selected HVDC voltage 407.

Figure 5:
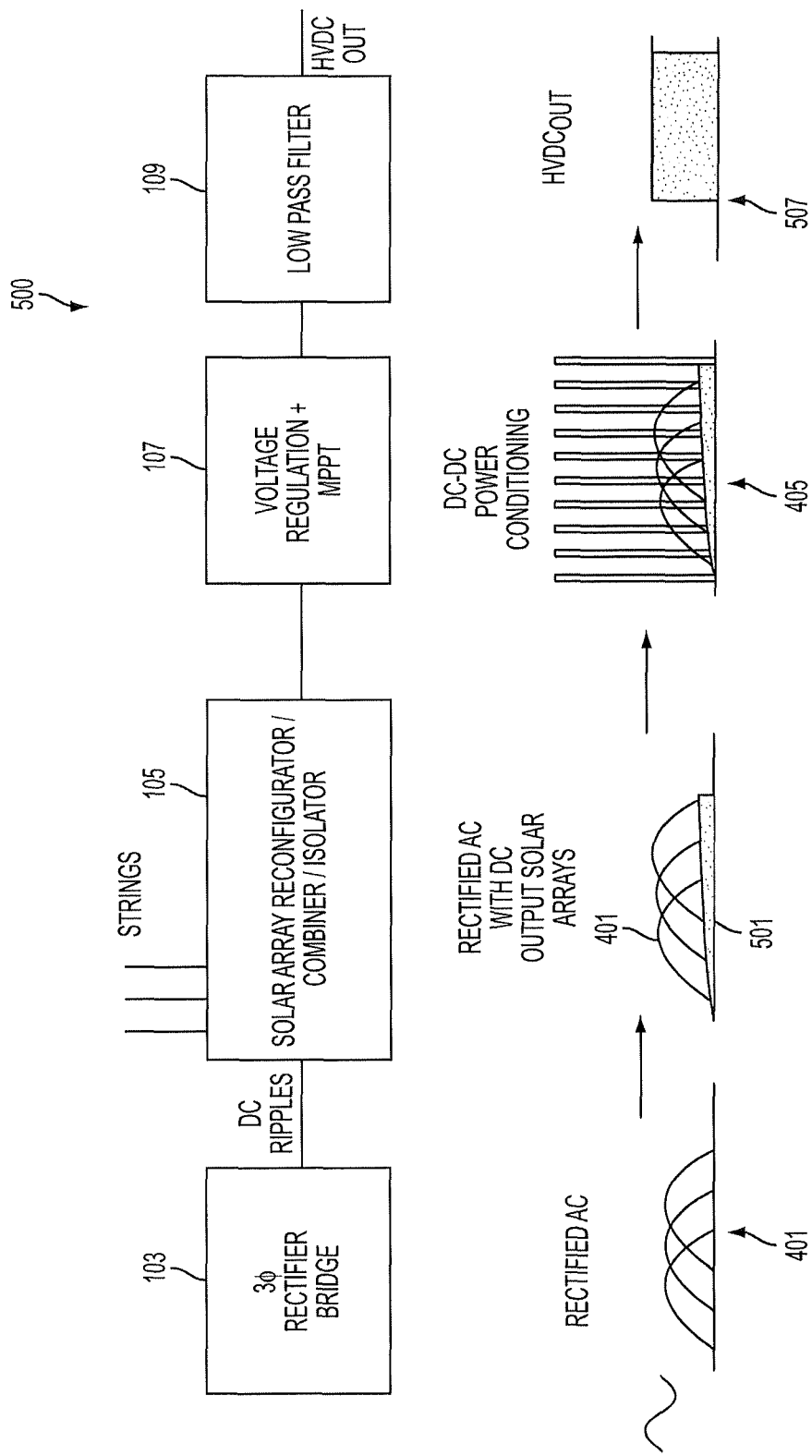
FIG. 5 illustrates an exemplary operational mode of the exemplary power system using a mixture of an AC-rectified DC voltage and a solar voltage.

FIG. 5 illustrates an exemplary operational mode 500 of the exemplary power system 100 using a mixture of AC-rectified DC voltage 401 and a solar voltage 501 from the string of solar panels. In various embodiments, the mixed operational mode 500 may be used when a voltage supplied by the string of solar panels is substantially non-zero ($V_{solar}>0$) but the current provided by the solar panels is less than the current load requirements of the load ($I_{solar}<I_{load}$). In the exemplary mixed operation mode 500, the solar array module 105 is configured to combine the voltage 401 from the rectifier 103 and the solar voltage 501 obtained from the configurator. The configurator of the solar array module 105 is used to produce a DC-DC voltage conversion from the variable voltages of the strings of solar panels to the selected solar voltage, $V_{solar}$. The combined rectified voltage 401 and solar voltage 501 are output to the regulator 107. The regulator 107 provides either a buck conversion or a boost conversion to at least one of the rectified DC voltage 401 and the solar voltage 501, to meet a selected downline voltage condition. The combined voltages are then filtered at filter 109 to provide a selected HVDC voltage 507.

Figure 6:
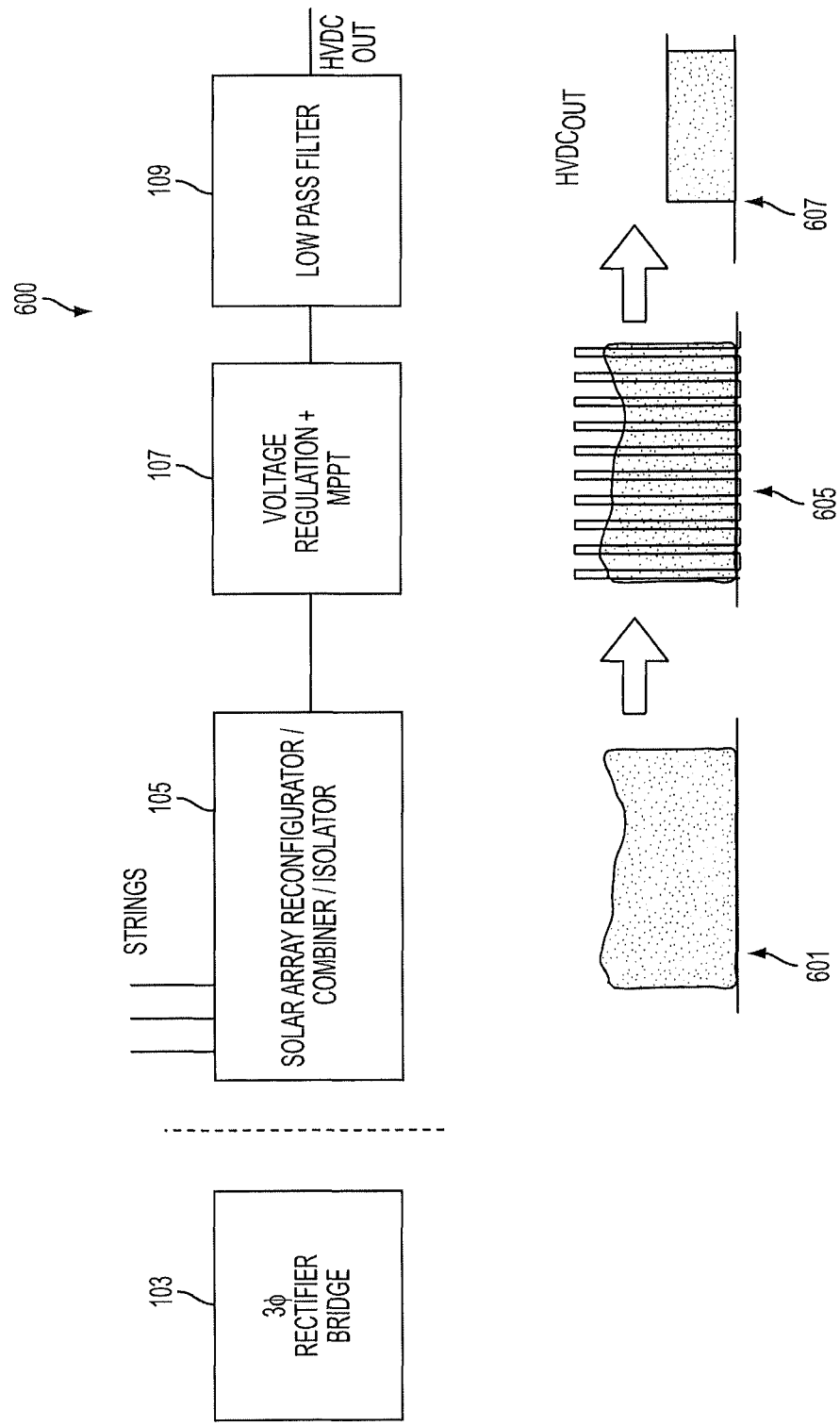
FIG. 6 shows another exemplary operational mode of the exemplary power system that uses only solar energy.

FIG. 6 shows another exemplary operational mode 600 of the exemplary power system that uses only solar energy. In various embodiments, this purely-solar operational mode 600 may be used when a power provided by the string of solar panels is substantially equal to a power requirement of the load, such as the exemplary data center. ($P_{solar}=P_{load}$). In the exemplary operation mode 600, the rectifier 103 is isolated from the solar array module 105, and the solar array module 105 therefore receives only the variable voltages from the string of solar panels. The configurator combines the variable voltages using exemplary methods disclosed herein to provide a selected solar voltage $V_{solar}$ 601 to the voltage regulator 107. The voltage regulator 107 bucks or boosts the solar voltage to a selected output voltage 605 according to exemplary methods disclosed herein. Filter 109 then filters the voltage to provide a selected HVDC voltage 607.

Another operational mode (not illustrated) may be used to store excess power from the string of solar panels. This operational mode may be used when power provided by the string of solar panels is greater than the power requirements of the load, ($P_{solar}>P_{load}$) Excess generated power may be stored in an energy storage device, such as a chargeable battery, for example, or supplied to the power grid.

Returning to FIG. 2, switches S1-S6 may be configured to select a mode of operation of the exemplary power system 100 from among the exemplary operational modes discussed above. To operate in the exemplary operational mode 200 (no solar energy), switches S1 and S4 are closed while the remaining switches S2, S3, S5 and S6 are left open. To operate in the exemplary operation mode 300 (mixture of solar energy and grid energy), switches S1, S2 and S3 are closed, while switches S4, S5 and S6 are left open. To operate in the exemplary operational mode 400 (solar energy only), switches S2, S3 and S5 are closed while switches S1, S4 and S6 are open. The discussed operational mode in which excess solar power is stored may be obtained by closing switches S2, S3, S5 and S6, while leaving switches S1 and S4 open. Measurement and switching control unit 210 may be used to monitor various parameters of the exemplary power system 100 and the solar array module 500 to select a suitable mode of operation. The switches may be solid state switches and/or traditional relay switches.

Figure 7:
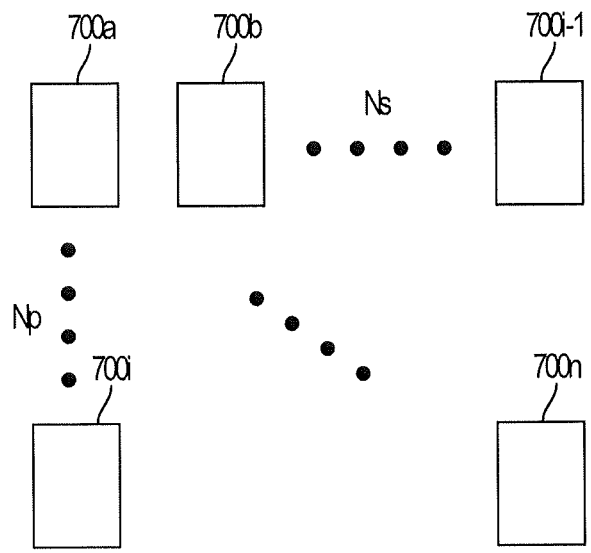
FIG. 7 shows a schematic representation of a solar panel configuration of the exemplary power system.

FIGS. 7-12 illustrate methods of using the solar array configurator to provide solar energy to the exemplary data center. FIG. 7 shows a schematic representation of a solar panel configuration of the exemplary power system 100. Each of the solar panels 700a, 700b, ..., 700i-1, 700i, ..., 700n may be strung together in various combinations of parallel connections and serial connections according to load requirements. Stringing the panels together in a parallel connection increases the total current output and the string's current carrying capacity. Stringing the panels together in a serial connection increases the total voltage output. In an exemplary embodiment, the number of parallel connections is selected so as to be greater than a ratio of the current requirements of the load to a maximal current carrying capacity of a string, as shown in Eq. (1).

$$N_p \geq I_{load}/I_{panel(max)} \quad \text{Eq. (1)}$$

Additionally, the number of serial connection is generally selected so as to be greater than a ratio of the minimum load voltage to a voltage of a solar panel, as shown in Eq. (2).

$$N_s \geq V_{load(min)}/V_{panel} \quad \text{Eq. (2)}$$

Figure 8:
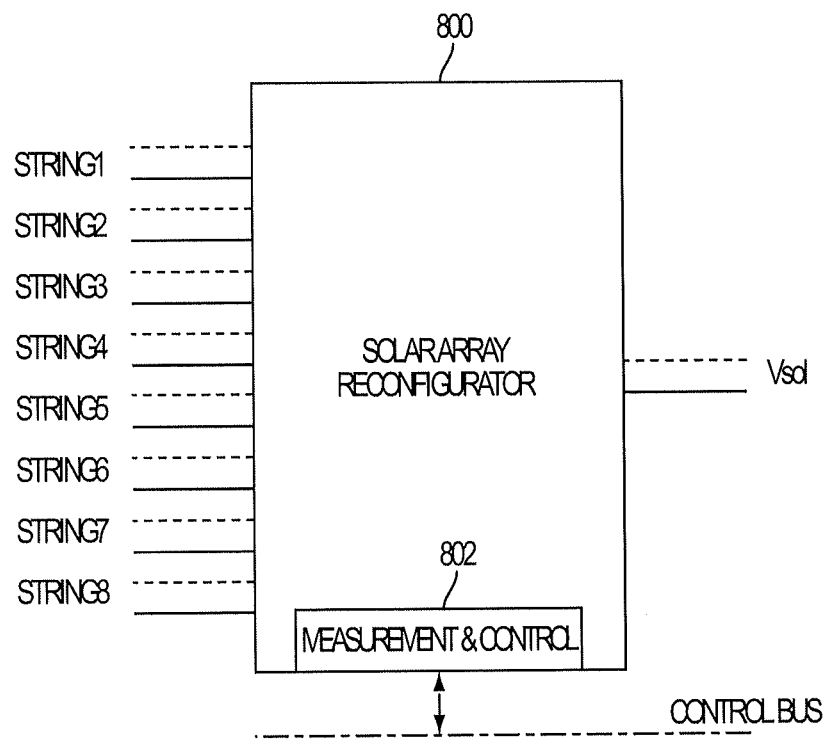
FIG. 8 shows an exemplary solar array configurator of the exemplary power system of the present disclosure.

FIG. 8 shows an exemplary solar array configurator 800 of the exemplary power system 100. The solar array configurator 800 receives voltages from a plurality of strings of solar panels (String 1, ..., String 8) as input and performs a DC-DC voltage conversion to provide an output voltage ($V_{solar}$). One goal of the solar array configurator 800 is to provide a solar voltage such that a total voltage output of the solar voltage and the rectified voltage is greater than a load voltage requirement. Then, the total voltage output may be bucked to obtain a selected voltage level. In general, buck voltage conversion is more efficient than boost voltage conversion. The configurator therefore ensures that solar strings 1-8 are dynamically reconfigured in one or a series connection and a parallel connection in order to sustain high DC voltage levels. The solar voltage output from the configurator 800, referred to herein as $HVDC_{SOL}$, is constrained by Eq. (3):

$$\Sigma_{i=1}^{n} V\min_{STR-i} \leq HVDC_{solar} \leq V\max_{STR-n} \quad \text{Eq. (3)}$$

Although eight strings of solar panels (representative of the solar panels 700a-700n of FIG. 7) are shown for illustrative purposes, any selected number of strings of solar panels may be provided to the solar array configurator 800 in alternate embodiments. The solar array configurator 800 further includes a measurement and control unit 802 that selects switch configurations to perform the DC-DC conversion using the methods discussed below with respect to FIGS. 9-12.

Figure 9:
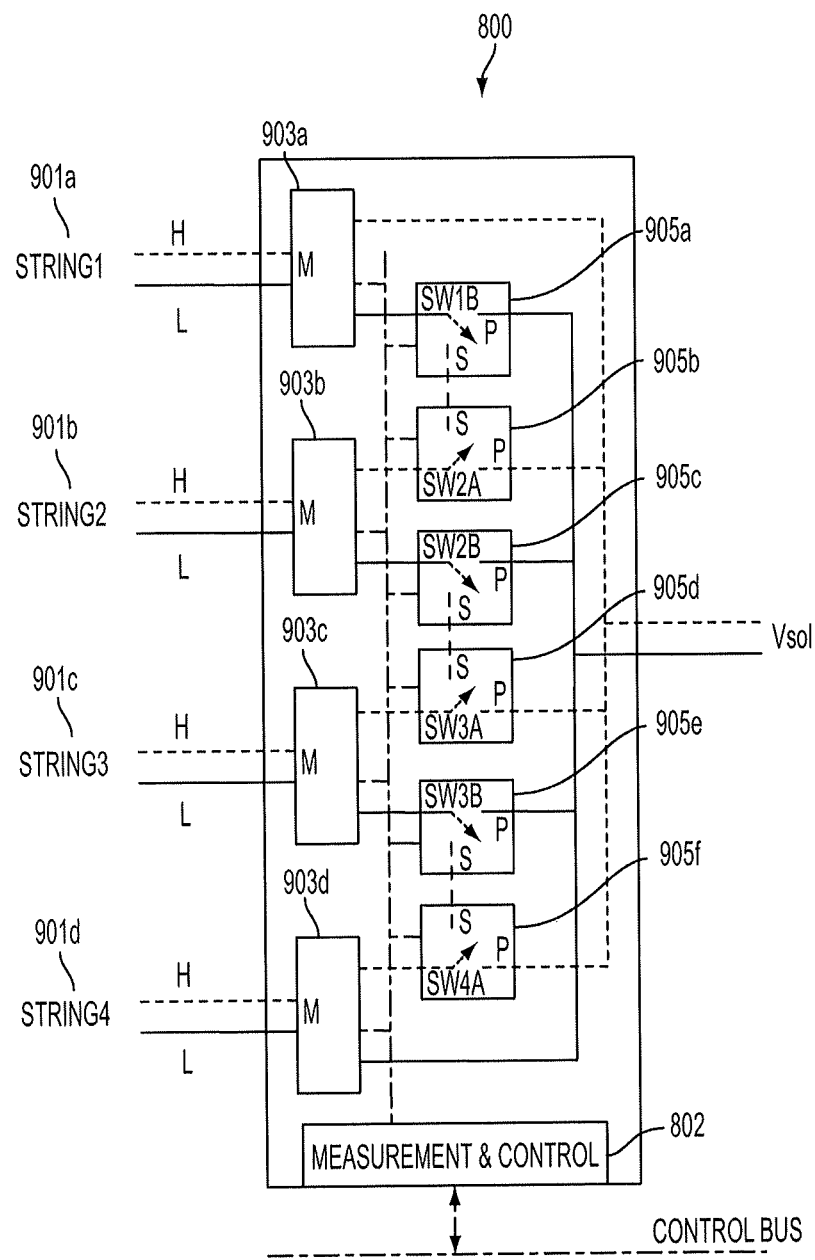
FIG. 9 shows a basic internal configuration of the exemplary solar array configurator of FIG. 8.

FIG. 9 shows a basic internal configuration of the exemplary solar array configurator 800. FIG. 9 shows four strings 901a-901d of solar panels provided at an input side of the solar array configurator 800. Each string includes two lines, generally a high voltage line and a low voltage line, labeled H and L, respectively. Measurement devices 903a-903d are provided for string inputs 901a-901d, respectively. A selected measurement device measures a voltage between the high line and the low line of the corresponding string. The measured voltage is generally variable, since it is a result of solar energy and is therefore affected by various random environmental conditions. A measured voltage may be transmitted to the measurement and control unit 802 for operation of the solar array configurator 800. The high and low lines of the strings are selectively coupled to one of the switches 905a-905f. In the configuration of FIG. 9, the low line of string 1 (901a) is coupled to the input of switch 905a, the high line of string 2 (901b) is coupled to the input of switch 904b, the low line of string 2 (901b) is coupled to the input of switch 904c, the high line of string 3 (901c) is coupled to the input of switch 904d, the low line of string 3 (901c) is coupled to the input of switch 904e and the high line of string 4 (901d) is coupled to the input of switch 904f. The high voltage line of string 1 (901a) is not coupled to a switch input but is instead coupled to output of the switches 905b, 905d and 905f to provide a composite high voltage line at the output of the configurator 800. Also, the low voltage line of string 4 (901d) is not coupled to a switch but is instead coupled to output of the switches 905a, 905c and 905e to provide a composite low voltage line at the output of the configurator 800. The solar voltage ($V_{solar}$) output by the configurator is therefore a difference between the voltages of the composite high voltage line and the composite low voltage line. Each of switches 905a-905f may be placed in one of a parallel switch position and a serial switch position and are coupled to each other so that the strings may be dynamically connected in various combinations of parallel connections and serial connections, as discussed below with respect to FIGS. 10-12. The measurement and control unit 802 may configure a selected switch to a selected position based on the measured voltages obtained from the volt meters 903a-903d. In one embodiment, the measurement and control unit may determine a configuration of switches 905a-905d that provides a selected $V_{solar}$ output and provide a command to the switches 905a-905d to flip into a position suitable to provide the determined configuration. Depending on the voltage level for each string, the measurement and control 802 unit may serialize (connect in serial) or parallelize (connect in parallel) any set of strings together, and not only adjacent strings.

Figure 10:
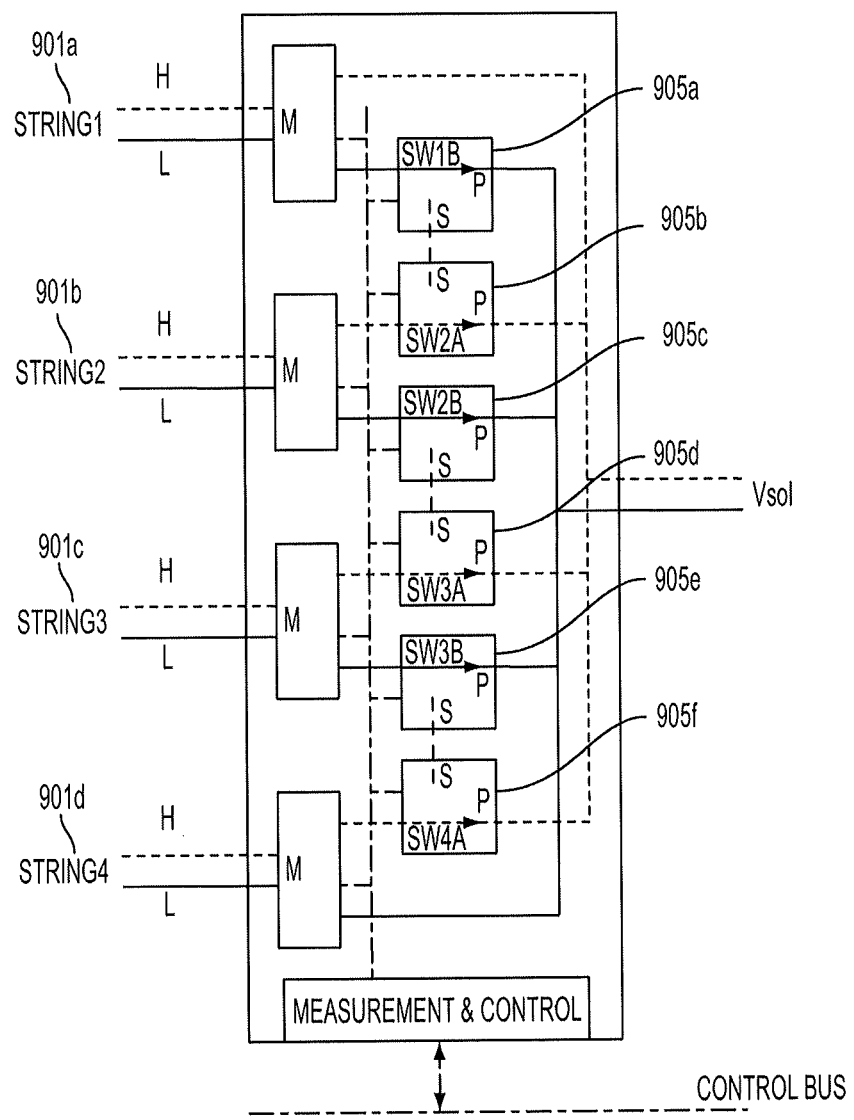
FIG. 10 shows an exemplary parallel switch configuration of the configurator of FIG. 8.

FIG. 10 shows an exemplary switch configuration of the configurator 900 in which the strings 901a-901d are connected in parallel. The switches 905a-905d are all flipped to a position that couples the high voltage lines of the strings 901a-901d with each other and coupled the low voltage lines of the strings 901a-901d with each other.

Figure 11:
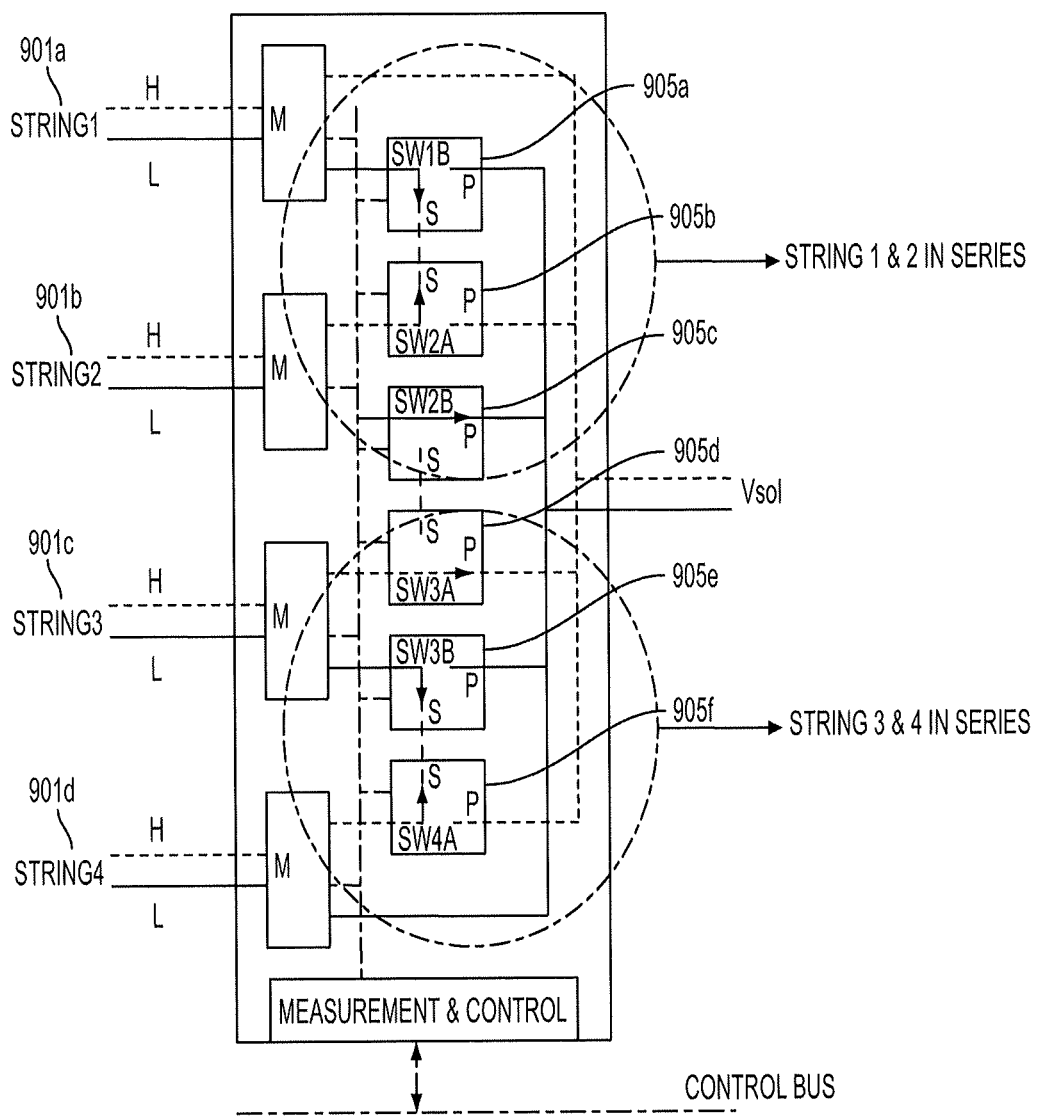
FIG. 11 shows an exemplary serial configuration of the configurator of FIG. 8.

FIG. 11 shows an exemplary serial configuration of the configurator 1000. Switches 905a and 905b are placed in a position so that the low voltage line of string 1 (901a) is coupled to the high voltage line of string 2 (901b), thereby serially connecting string 1 (901a) and string 2 (901b). Also, switches 905e and 905f are placed in a position so that the low voltage line of string 3 (901c) is coupled to the high voltage line of string 4 (901d) thereby serially connecting string 3 (901c) and string 4 (901d). Switches 905c and 905d remain in a parallel switch position. Thus, the high voltage line of $V_{solar}$ is coupled to the high voltage lines of string 1 (901a) and string 3 (901c), and the low voltage line of $V_{solar}$ is coupled to the low voltage lines of string 2 (901*b*) and string 4 (901*d*). The serial connections in FIG. 11 increase the voltage output of the configurator from the same output from the configuration of FIG. 10. Switching from the configuration of FIG. 10 to the configuration of FIG. 11 may be referred to a stepping to a next serialization level. Similarly, switching from the configuration of FIG. 11 to the configuration of FIG. 10 may be referred to a stepping to a next parallelization level.

Figure 12:
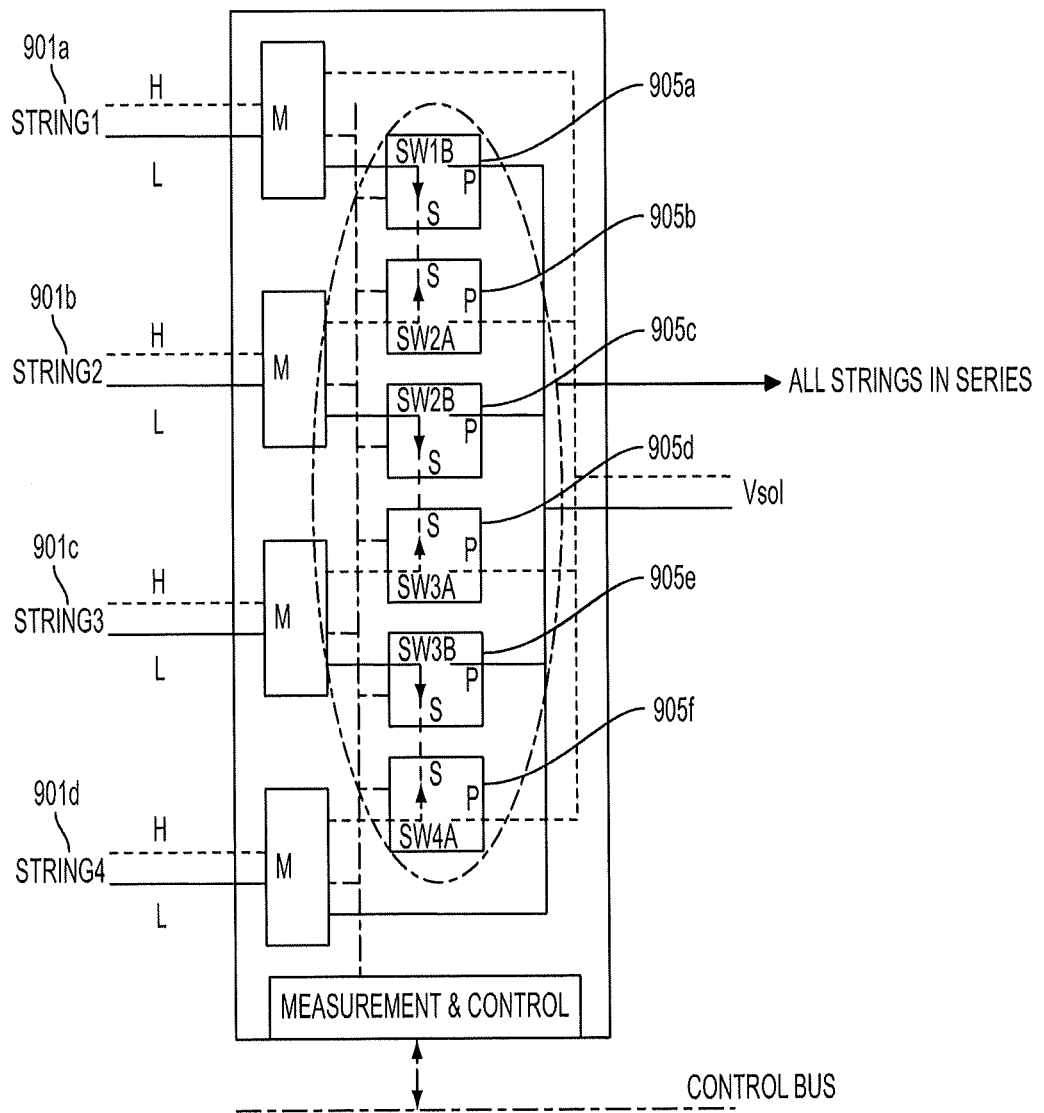
FIG. 12 shows another serial configuration of the configurator of FIG. 8.

FIG. 12 shows another serial configuration of the configurator 800. Switches 905*a* and 905*b* are placed in a serial position so that the low voltage line of string 1 (901*a*) is coupled to the high voltage line of string 2 (901*b*). Switches 905*c* and 905*d* are placed in a serial position so that the low voltage line of string 2 (901*b*) is coupled to the high voltage line of string 3 (901*c*). Switches 905*e* and 905*f* are placed in a serial position so that the low voltage line of string 3 (901*c*) is coupled to the high voltage line of string 4 (901*d*). Therefore, the strings 1 through 4 (901*a*-901*d*) are entirely serially connected. The high voltage line of $V_{solar}$ is coupled to the high voltage lines of string 1, and the low voltage line of $V_{solar}$ is coupled to the low voltage line of string 4. Switching from the configuration of FIG. 11 to the configuration of FIG. 12 may be referred to a stepping to a next serialization level. Similarly, switching from the configuration of FIG. 12 to the configuration of FIG. 11 may be referred to a stepping to a next parallelization level.

Figure 13:
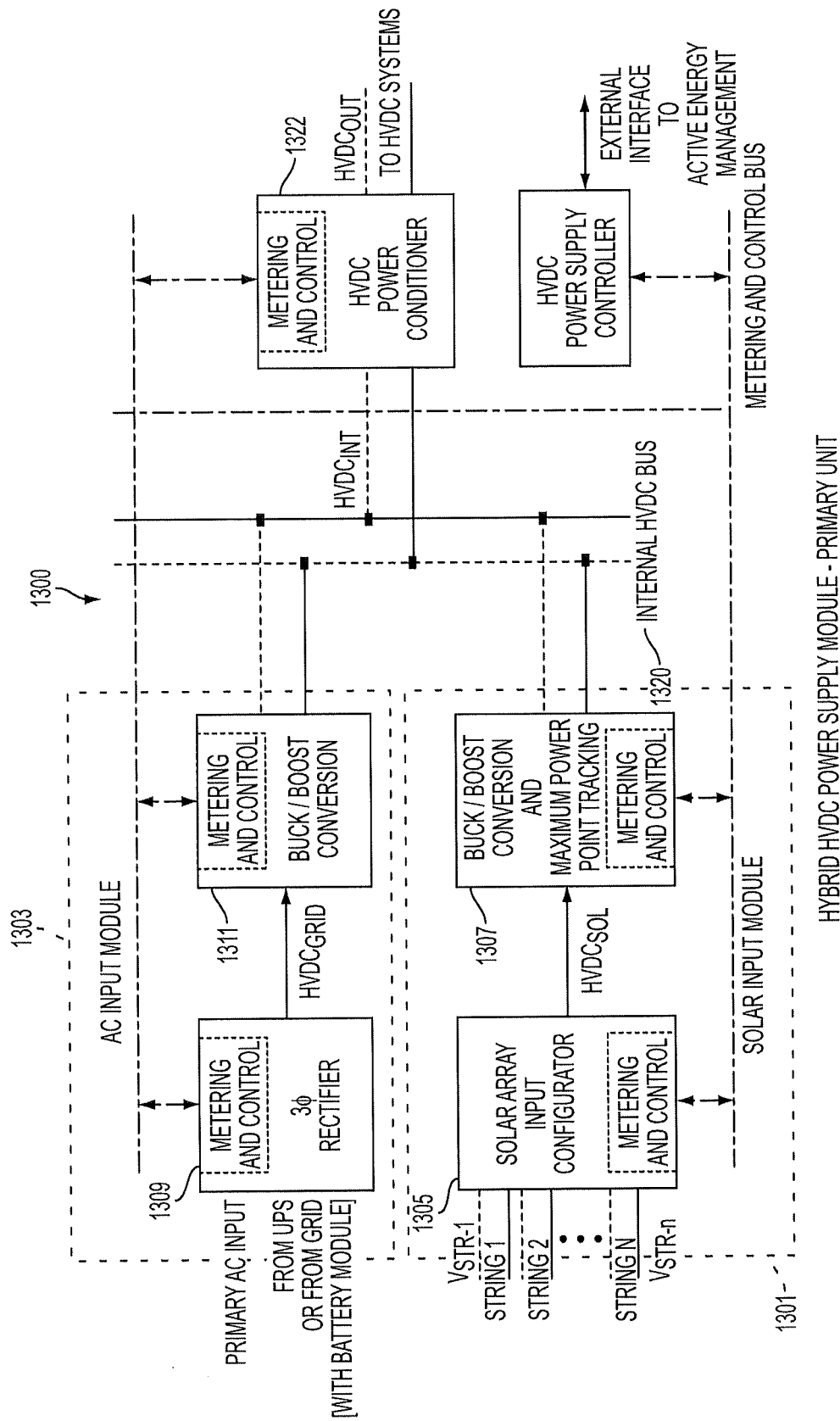
FIG. 13 shows an exemplary hybrid HVDC power supply module in one embodiment of the present disclosure.

FIG. 13 shows an exemplary hybrid HVDC power supply module 1300 in one embodiment of the present disclosure. The exemplary hybrid HVDC power supply module 1300 includes a solar input module 1301 and an AC input module 1303. The solar input module 1301 includes a solar array input configurator 1305 and a buck/boost conversion and maximum power point tracking module 1307. The solar array input configurator 1301 receives solar voltages $V_{STR-1}, \ldots V_{STR-n}$ from a plurality of strings of solar panels (String 1, . . . String N) and provides an output voltage $HVDC_{SOL}$ using the methods disclosed with respect to FIG. 7-12. The buck/boost conversion and maximum power point tracking module 1307 performs either a buck conversion to lower $HVDC_{SOL}$ or a boost conversion to increase $HVDC_{SOL}$. The converted voltage is supplied to an internal HVDC bus 1320. The AC input module 1303 includes a rectifier 1309 and a buck/boost converter 1311. In one embodiment, the rectifier 1309 receives AC voltage from a power grid. In various embodiments, the rectifier may also or alternately receive an AC voltage from an uninterrupted power supply. The rectifier 1309 converts the AC voltage to a substantially constant DC voltage, $HVDC_{GRID}$. The buck/boost converter 1311 may perform either a buck conversion to lower $HVDC_{GRID}$ or a boost conversion to increase $HVDC_{GRID}$. The converted voltage is supplied to the internal HVDC bus 1320. Thus, the voltage along the internal HVDC bus (i.e., $HVDC_{INT}$) may be either solar voltage, grid voltage or a combination of solar voltage and grid voltage. In various embodiments, the internal bus voltage (i.e., vModuleOut) is maintained between a low voltage (i.e., vBusLow) and a high voltage (i.e., vBusHigh). In an exemplary embodiment, the internal bus voltage may be maintained between about 380 volts and about 420 volts. The $HVDC_{INT}$ is supplied to a power conditioner 1322 that supplies a voltage to the load, i.e., the data computing center.

Figure 14:
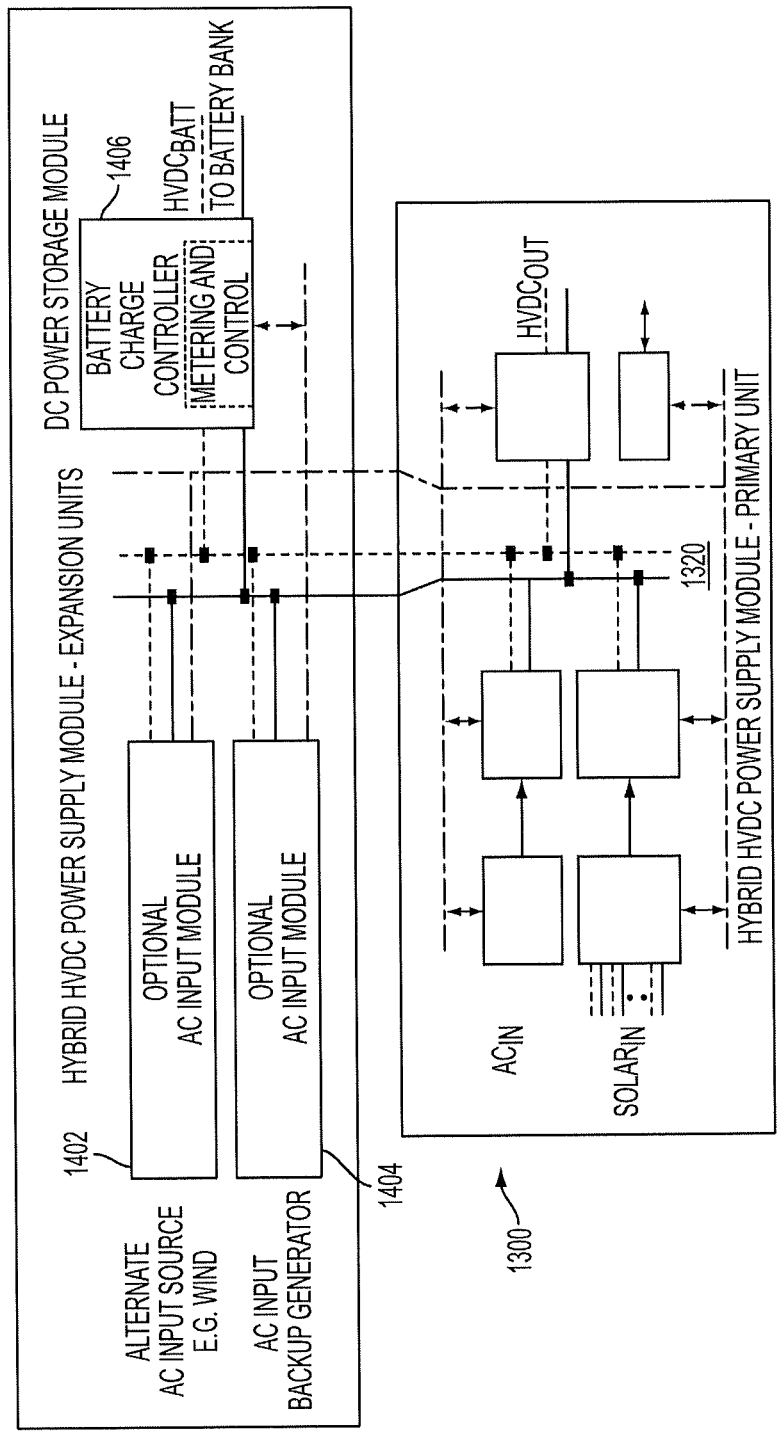
FIG. 14 shows an exemplary extension of the exemplary hybrid HVDC power supply module of FIG. 13.

FIG. 14 shows an exemplary extension of the exemplary hybrid HVDC power supply module 1300 of FIG. 13. The internal bus 1320 extends from the power supply module 1300 and may be further coupled to an optional AC input module that provides wind-generated voltage and an AC input backup generator 1404. Additionally, internal bus line 1320 may be coupled to a battery charge controller 1406 for power storage.

Operation of the exemplary power system 100 includes various operational stages. One stage may include initializing the power supply. Another stage may include initialization of the solar input module. Yet another stage may include operation of the solar input module according to a selected mode of operation. Yet another stage may include operating an AC rectifier module. Yet another stage may provide continuity of the power supply system during reconfiguration of the solar arrays. These stages are discussed in detail with respect to the exemplary flowcharts of FIGS. 15-19.

Figure 15:
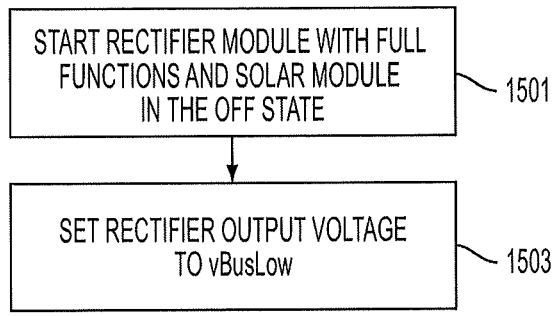
FIG. 15 shows a flowchart illustrating a method of initializing the power supply system of the present disclosure.

FIG. 15 shows a flowchart 1500 illustrating a method of initializing the power supply system 100. In box 1501, the rectifier module is turned on and raised to a fully operational state. Meanwhile, the solar module is maintained in an OFF state. In box 1503, the rectifier output voltage is set to vBusLow.

Figure 16:
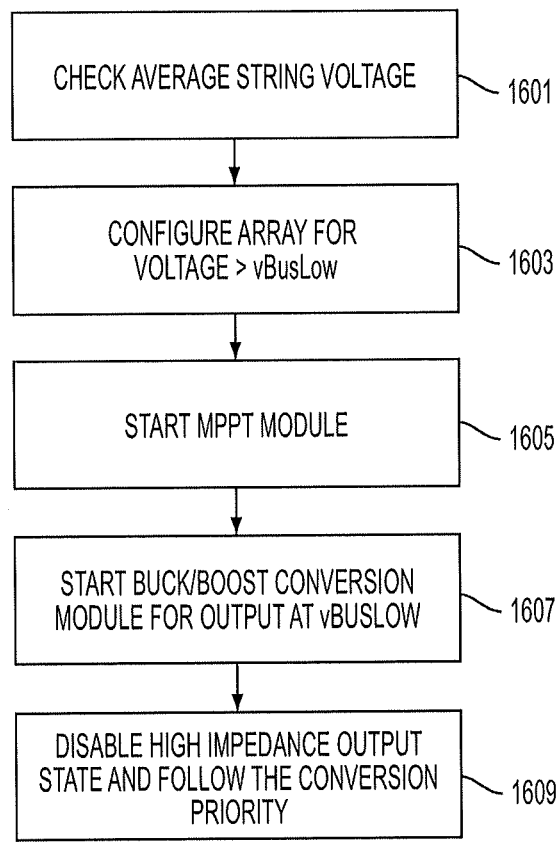
FIG. 16 shows a flowchart illustrating a method of initializing a solar input module of the exemplary power system of the present disclosure.

FIG. 16 shows a flowchart 1600 illustrating a method of initializing the solar input module. In box 1601, an average string voltage is determined. In box 1603, the configurator is configured to provide a voltage output (vModuleOut) that is greater than vBusLow. In box 1603, the MPPT module 1307 is started. In box 1607, buck/boost conversion is started to provide output at vBusLow. In box 1609, a high impedance output state is disabled.

Figure 17:
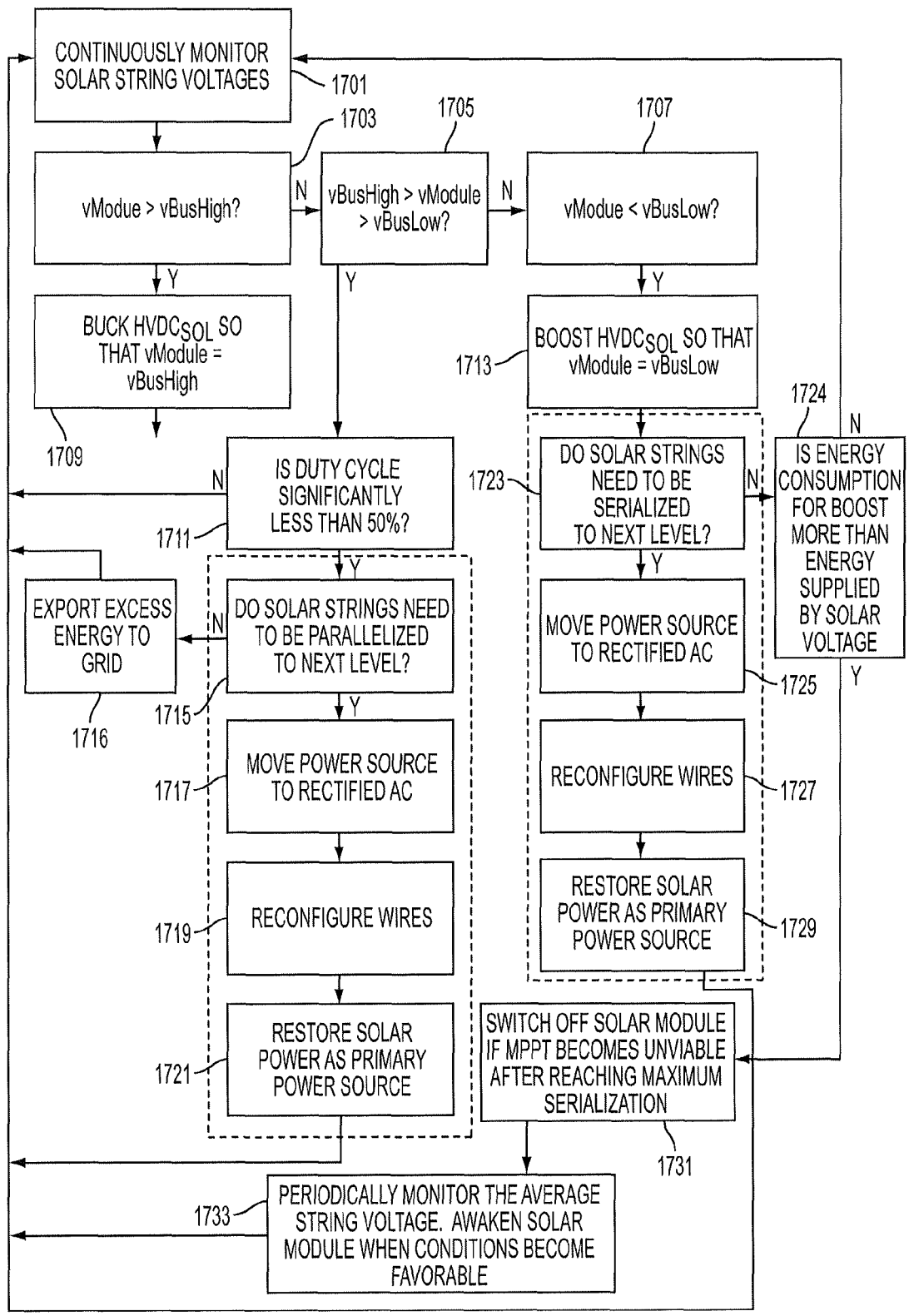
FIG. 17 shows a flowchart illustrating a method of operating a solar module of the exemplary power system of the present disclosure.

FIG. 17 shows a flowchart 1700 illustrating a method of operating the solar module according to present disclosure. In box 1701, the voltage $HVDC_{SOL}$ is monitored. In various embodiments, the voltage may be monitored on a continuous basis, in various embodiments. In boxes 1703, 1705 and 1707, a determination is made of the value of the vModule voltage with respect to vBusHigh and vBusLow. If vModule is greater than or equal to vBusHigh (box 1703), the method proceeds to box 1709 wherein the $HVDC_{SOL}$ is buck converted so that vModule=vBusHigh. Maintaining vModule at vBusHigh is a desirable operating state of the power system. From box 1709, the method proceeds to box 1711 wherein a duty cycle of the converter is determined. Otherwise, vModule is compared to vBusHigh and vBusLow in box 1705. If vModule is between vBusHigh and vBusLow, the method proceeds directly to box 1711, where the duty cycle of the converter is determined. If vModule is not between vBusHigh and vBusLow, the method proceeds to box 1707. In box 1707 if vModule is less than vBusLow, then the method proceeds to box 1713 wherein $HVDC_{SOL}$ is boosted so that vModule=vBusLow.

Looking now at box 1711, if the duty cycle of the buck converter is significantly lower than 50%, then the configuration of the solar strings is checked to see if the solar strings need to be parallelized to a new level, as shown in boxes 1715, 1717, 1719 and 1721. If the duty cycle is not significantly lower than 50%, the method proceeds from box 1711 to box 1701 to monitor solar string voltages.

Returning now to boxes 1715, 1717, 1719 and 1721, in box 1715 a determination is made whether the solar strings need to be parallelized to the next level. If the answer is NO, then the method proceeds to box 1716. In box 1716, excess energy is exported back to the grid and the process then returns to box 1701 to monitor the solar string voltages. If the answer to the parallelization question in box 1715 is YES, then the method proceeds to box 1717. In box 1717, the power source is adjusted so that the power is obtained from the rectified AC voltage source. Then in box 1719, the wires of the solar strings are reconfigured (to the next parallelization level). In box 1721, the solar power source is restored as the primary power source. After box 1721, the method proceeds to box 1701 to monitor solar string voltages.

Looking now at box 1713, once the $HVDC_{SOL}$ is boosted so that vModule=vBusLow, the method proceeds to check to see if the solar strings need to be serialized to a new level. In box 1723 a determination is made whether the solar strings need to be serialized to the next level. If the answer is NO, then the method proceeds to box 1724. In box 1724, a determination is made if the energy consumption for a boost is more than energy supplied to by the solar voltage. If the answer in box 1724 is NO there is not enough solar voltage supplied, the method proceeds to box 1701 to monitor solar string voltages. If the answer in box 1724 is YES and there is enough solar voltage, the method proceeds to box 1731. Returning to box 1723, if the answer is YES, then the method proceeds to box 1725. In box 1725, the power source is adjusted so that the power is obtained from the rectified AC voltage source. Then in box 1727, the wires of the solar strings are reconfigured (to the next serialization level). In box 1729, the solar power source is restored as the primary power source. After box 1729, the method proceeds to box 1701 to monitor solar string voltages.

In box 1731, the MPPT of the solar module is determined. If the configurator is at maximal serialization and the MPPT is still unviable, the solar module is shut off. In box 1733, the average string voltage is monitored periodically in order to determine a suitable time to restart the solar module. When a suitable time is determined, the solar module is awakened and the solar string voltages are monitored by returning to box 1701.

Figure 18:
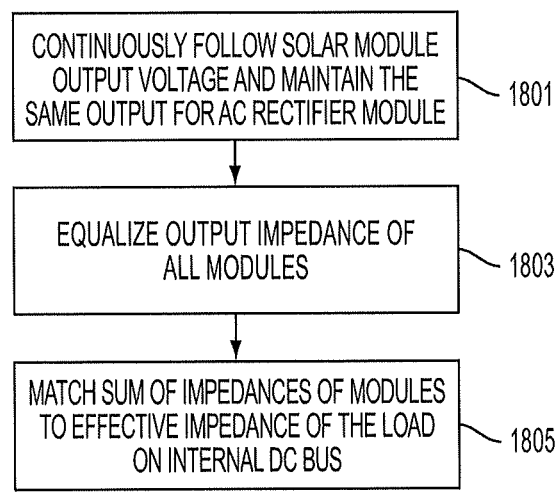
FIG. 18 shows an exemplary flowchart of a method for operating a rectifier module of the exemplary power system of the present disclosure.

FIG. 18 shows an exemplary flowchart 1800 of a method for operating the rectifier module. In box 1801, the rectified voltage continuously follows the solar module output voltage and maintains a same output voltage at the rectified module. In box 1803, output impedances of the modules (i.e., the solar module and the rectifier module) are equalized. In box 1805, the sum of the impedances of the modules is matched to an effective impedance of the load at the internal DC bus.

Figure 19:
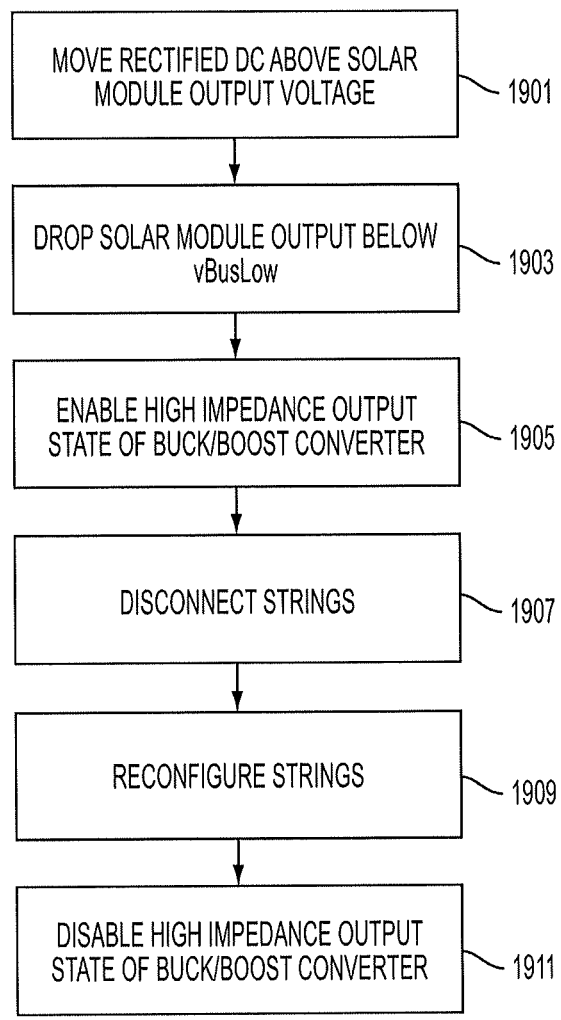
FIG. 19 shows an exemplary flowchart of a method for providing continuity of the exemplary power supply of the present disclosure during a solar array reconfiguration.

FIG. 19 shows an exemplary flowchart 1900 of a method for providing continuity of power supply during a solar array reconfiguration. In box 1901, the rectified DC voltage is moved above the solar module output voltage. In box 1903, the solar module voltage output is dropped below vBusLow. In box 1905, a high impedance output state is enabled at the buck/boost converter. In box 1907, strings of solar panels are disconnected at the configurator. In box 1909, the strings are rewired according to a selected configuration. In box 1911, the high impedance output state of the buck/boost converter is disabled.

Figure 20:
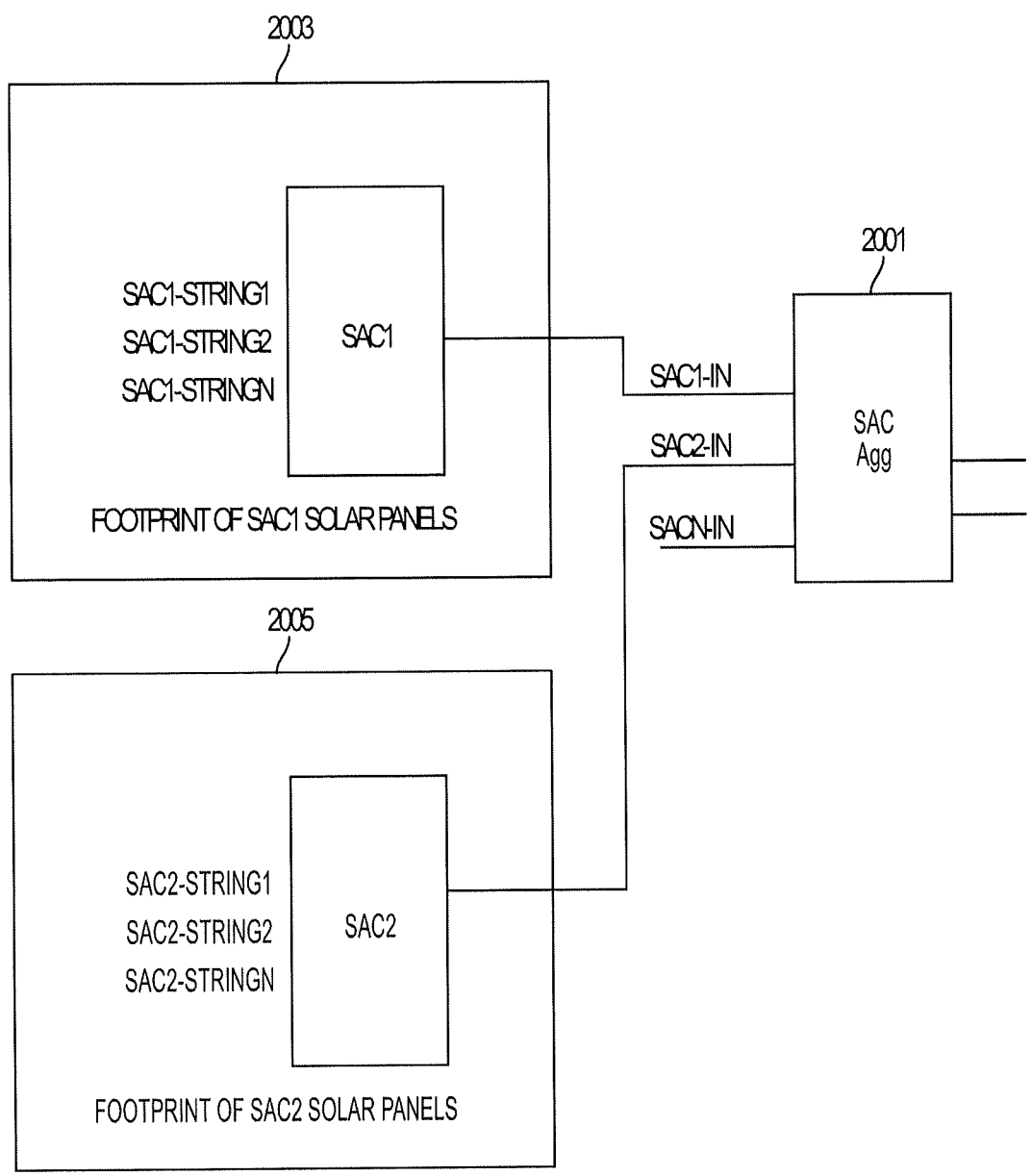
FIG. 20 shows a configurator combination that may be suitable for providing voltages for large scale products

FIG. 20 shows a configurator combination that may be suitable for providing voltages for large scale products. Solar configurator SAC1 (2003) and solar configurator SAC2 (2005) are fed as inputs into a solar configurator aggregator SAC Agg (2001). The SAC Agg 2001 may be operated as the exemplary configurator disclosed herein only having the output of other solar configurators as input to the SAC Agg 2001. Thus, the SAC Agg 2001 may be used to augment the serialization and parallelization power of the individual solar configurators SACT 2003 and SAC2 2005. Additional solar configurators may also be provided to SAC Agg 2001, as represented by input line SACN-IN.

The solar array configurator (call it, say, SAC) output can be fed as a single string pair into yet another solar array configurator to address large scale projects.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of powering an electronic device, comprising:
receiving a high voltage line and a low voltage line from each of a plurality of variable DC power sources at a configurator;
forming a combination of the high voltage lines to obtain a composite high voltage line at an output of the configurator;
forming a combination of the low voltage lines to obtain a composite low voltage line at an output of the configurator, wherein a solar voltage is a difference between the composite high voltage line and the composite low voltage line;
receiving a substantially constant DC voltage from a constant DC power source;
combining the solar voltage with the substantially constant DC voltage to obtain the selected DC voltage; and
providing the selected DC voltage to the electronic device.

2. The method of claim 1, wherein the variable DC power source includes at least one of a solar panel; and a wind-powered generator.

3. The method of claim 1, further comprising receiving the substantially constant DC voltage from at least one of a rectifier and a battery.

4. The method of claim 1, further comprising configuring a set of switches to perform one of: isolating the variable DC power source; isolating constant DC voltage source; and combining the solar voltage with the substantially constant DC voltage.

5. The method of claim 1, wherein the configurator forms the combination of the high voltage lines using one or more of parallel and series connections and forms the combination of the low voltage lines using one or more of parallel and series connections.

6. The method of claim 5, further comprising selecting the parallel and series connections based on voltage measurements taken from the high voltage lines and the low voltage lines at the configurator.

7. The method of claim 1, further comprising performing one of a buck conversion and a boost conversion to convert the combination of the solar voltage and the substantially constant DC voltage to obtain the selected DC voltage.

8. The method of claim 1, further comprising configuring the variable DC voltage so that the obtained selected DC voltage meets a load requirement of the electronic device.

* * * * *